May 29, 1973
W. H. LEISTNER
3,736,198
METHOD OF FORMING A NAILING STRIP BY
APPLYING A HOT MELT LIQUID PLASTIC
Filed Feb. 8 1971
3 Sheets-Sheet 1
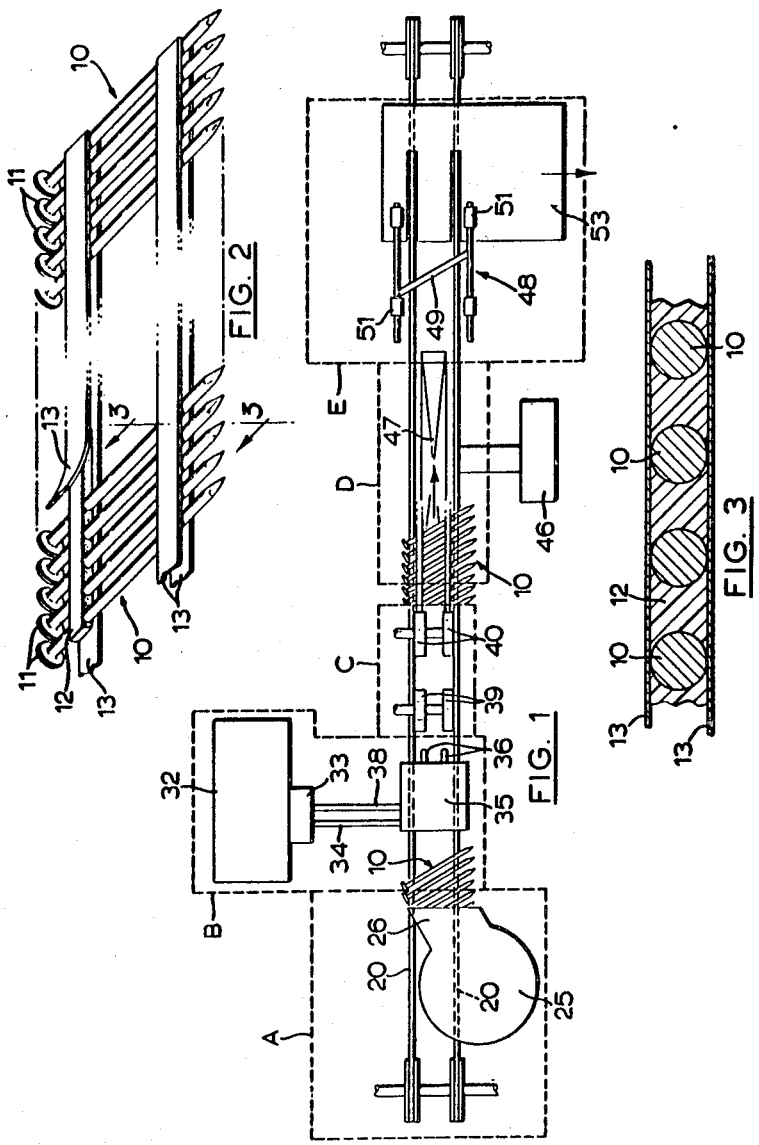
INVENTOR.
WALTER H. LEISTNER
BY George A. Rolston
Agent

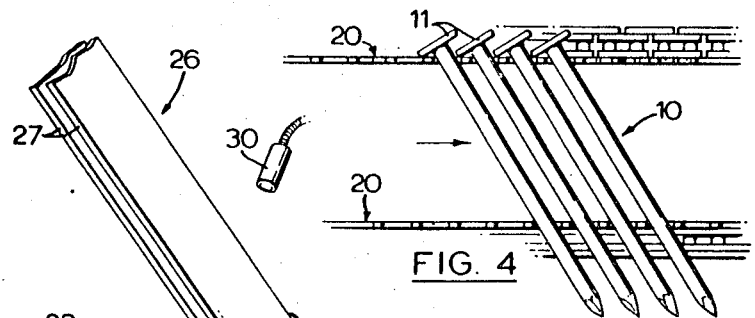
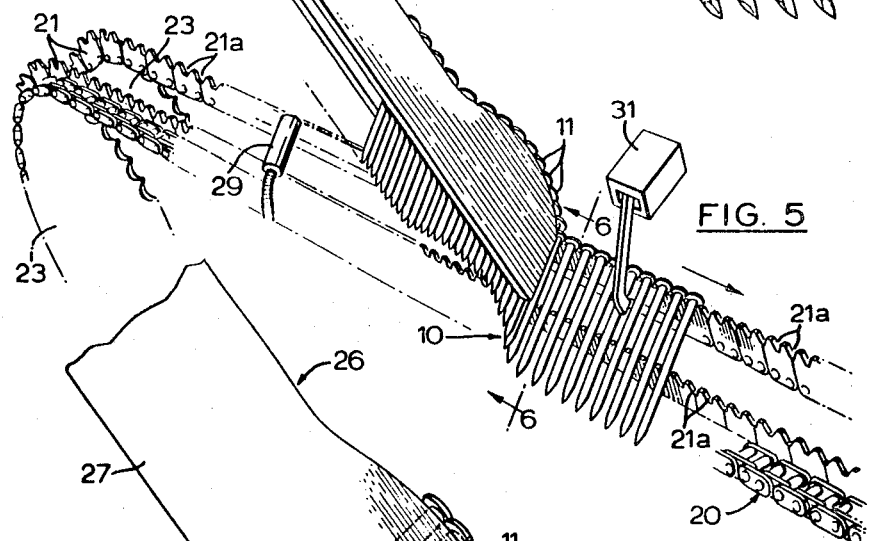
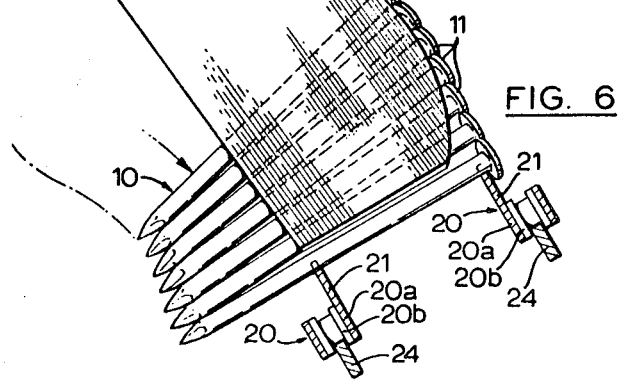

Inventor
WALTER H. LEISTNER
by: *George A. Rolston*

3,736,198
METHOD OF FORMING A NAILING STRIP BY APPLYING A HOT MELT LIQUID PLASTIC
Walter Herman Leistner, 97 Alamosa Drive,
Willowdale, Ontario, Canada
Continuation-in-part of abandoned application Ser. No. 737,629, June 17, 1968. This application Feb. 8, 1971, Ser. No. 113,458
Int. Cl. B32b *31/18, 31/20, 31/30*
U.S. Cl. 156—65                    3 Claims

ABSTRACT OF THE DISCLOSURE

This specification discloses a method of forming nails into a nailing strip of the type which is used in power operated nailing hammers, in which nailing strips the nails are supported spaced apart from one another by easily breakable material. The breakable material is applied in a hot liquid or semi-liquid state to both sides of the nails simultaneously and squeezed into the space between them. Covering material may be applied to the exterior of the hot material so as to add strength, and also to avoid accumulations of such material on the apparatus. The specification also discloses apparatus for performing such a method in which the nails are arranged to lie on a movable conveyor which is oriented in a plane angled relative to the horizontal whereby to employ both the horizontal and the vertical component of gravitational force acting on the nails and in which the hot material is extruded directly over and under the nails as they are carried on the conveyor from both sides in a direction slanted towards the direction of movement of the conveyor.

This invention relates to apparatus for forming nails into a so-called "nailing strip" such as is used in pneumatically operated nailing guns, and to a novel method of forming such nails into a strip, and a continuation-in-part of application Ser. No. 737,629, filed June 17, 1968, now abandoned.

BACKGROUND OF THE INVENTION

Many types of so-called nailing strips are known and in use in various different brands of nailing guns. The nails which are used in such guns in some cases are either headless, or have T-shaped heads. These types of nails can readily be struck together by the application of a thin layer of glue or resinous material along either side thereof, the nails themselves being pressed firmly against one another to form a continuous strip without any gaps between the nails such as is shown in United States Letters Patent 3,401,072. However, there are many nailing applications in which headless, or T headed nails are insufficient for the purpose, and do not provide adequate holding power. For these somewhat more rugged uses for nails, more conventional nails are required having round heads. However, a nail having an enlarged circular head is much more difficult to form into a nailing strip by economical methods. In this type of nailing strip, the heads usually partially overlap one another with a result that the nails are formed into a strip offset from one another, lengthwise, as to form a somewhat diagonally aligned strip. An example of such a strip is illustrated in United States Patent 3,212,632. However, even with such partial overlapping of the heads, the existence of the heads will prevent the nails from lying in contact with one another along their shanks. As a result, it is useless merely to attempt some means of bonding the nails together since they are not in contact with one another but are spaced apart. Accordingly, it is necessary to provide some means for holding the nails apart from one another in the strip so that they are at all times aligned parallel with one another. Various substances have been proposed for this purpose such as various types of paper and plastic material, but the great majority of these materials, as have been used in the past, while they have been effective for maintaining the nails apart from one another and in their parallel aligned arrangement, have proved highly deleterious to the effective operation of the nailing gun itself. The material will collect in the gun and cause blockages and misfeed of the nails and in some cases can even damage the gun itself. As a result, it is necessary to dismantle the gun after only a few applications, and clean it before use can be continued. On the other hand, if a lighter weight material is employed for holding the nails together, it is generally speaking found to be inadequate to hold the nails parallel to one another, while the endmost nail of the strip is being inserted by the nailing gun. As a result, the nail will go in out of alignment, and may damage the material into which it is being inserted or will remain protruding from the surface and require to be hammered in still further by hand. In one more recent method strips of hot thermoplastic glue material have been extruded onto paper tapes, and the glued tapes are then applied to opposite sides of the nails, but the process involves overheating the plastic to ensure that it retains sufficient heat to remain in a plastic state long enough to flow around the nails, during which time there is substantial heat loss to the nails. However, overheating of the plastic renders the plastic too liquid and it becomes difficult to handle. As a result, such a machine rapidly becomes clogged with waste plastic material and must be frequently stopped for cleaning. In addition, since the plastic was too hot it was also insufficiently viscous to be handled easily. As a result it tended to drip or run off the nails before setting. In an attempt to cure these problems the nails were supported vertically during application of the thermoplastic material which greatly complicated the design of the apparatus and led to increased expense. In addition, in this type of machine, the continuous feeding of nails with enlarged circular heads into a vertical track has never been achieved in a satisfactory manner, and it is almost invariably necessary to maintain an operator at the feed in end of the machine at all times to clear the blockages in the nail feed system which continually occur. Thus two operators are generally speaking required for one such machine making the operation relatively expensive.

BRIEF SUMMARY OF THE INVENTION

The invention, therefore, seeks to provide a method and apparatus for forming nails into a nailing strip which is adapted for use with nails having large circular heads, in which the nails feed mechanism supports the nails in an angled plane with the nails lying in position and held by gravity alone, and in which the nails are joined together by synthetic hot melt thermoplastic material which is applied in the form of a semi-liquid hot melt directly onto the nails by means of plastic applicators extruding plastic simultaneously both above and below the nails in predetermined proportions, the plastic material flowing around the nails and being sufficiently viscous to cling thereto without running, and rapidly hardening in place making a good adhesive union therewith without the use of excessive heating.

More particularly, it is an objective of the present invention to provide a method and apparatus having the foregoing advantages in which the nail feed portion of the mechanism for delivering nails to the apparatus is supported and oriented at an angle corresponding to that of the apparatus itself, whereby to ensure that the nails are fed to the apparatus continuously and automatically and do not jam.

It is a further and related objective of the invention to provide a method of forming nails into a nailing strip in which a hot semi-liquid plastic melt is applied in the form of two parallel strips directly onto the nails themselves from both sides simultaneously and is compressed simultaneously from both sides of the nails to flow therearound and make a good uniform adhesive bond thereto and fill the space therebetween, and simultaneously applying paper or the like covering strips to both sides of the hot plastic and covering the same, and cooling and setting the thermoplastic material.

More particularly, it is an objective of the present invention to provide a method having the foregoing advantages in which the paper strips are applied to the nails in registration with the parallel strips of hot plastic, and being pressed firmly thereagainst by continuous pressure whereby to securely bond the paper to the plastic and at the same time to cause the plastic to flow between the nails remote from the point of application of the plastic.

The foregoing and other advantages will become apparent from the following description of a preferred embodiment of the invention which is given here by way of example only and with reference to the following drawings in which like reference devices refer to like parts thereof throughout the various views and diagrams.

BRIEF DESCRIPTION OF THE DRAWINGS

FIG. 1 is a schematic top plan view of the apparatus according to the invention, the apparatus being in fact viewed at the angle of about 30 degrees from the vertical in order to show the layout of the apparatus along a line of sight normal thereto;

FIG. 2 is a greatly enlarged perspective illustration of a nailing strip made according to the invention, partially cut away to reveal the construction;

FIG. 3 is a greatly enlarged section along the line 3—3 of FIG. 2;

FIG. 4 is a greatly enlarged plan view showing the conveyor portion of the apparatus shown in FIG. 1 with the nails lying thereon;

FIG. 5 is a perspective illustration of the nail feed mechanism according to the invention, and forming part of stage A thereof;

FIG. 6 is a section along the line 6—6 of FIG. 5 showing in elevation the lower portion of the nail feed mechanism;

From FIG. 2 it will be seen that the nailing strip according to the invention comprises a plurality of nails 10 which are twisted along their shanks, although this is not critical, and having circular heads 11. The nails are arranged in a slanted fashion whereby the heads 11 overlap one another and contact the shank of the next adjacent nail 10 thereby defining the distance separating any two nails. The nails are bonded together parallel to one another in such slanted alignment by means of thermoplastic material 12, the thermoplastic material 12 being covered on each side by thin strips of paper 13. A nailing strip of the type shown in FIG. 2 is employed in a pneumatic or other type of power operated nailing gun (not shown) the endmost nail in the strip being arranged to lie in the path of the impact portion of the hammer, which, when operated strikes the head of the nail and breaks the nail away from the remainder of the strip simultaneously shattering that portion of the thermoplastic material 12 and paper 13 surrounding that particular nail 10 into very small fragments, thereby enabling such small fragments to be carried away from the moving path of the nailing gun without accumulating and causing malfunction. FIG. 3 illustrates a section along the line 3—3 of FIG. 2 of the nailing strip shown in FIG. 2, and it will be seen from FIG. 3 that the thermoplastic material 12 has flowed around each nail 10 conforming intimately thereto, there being a thickness of such plastic material 12 adjacent to the upper and lower surface of each nail 10, and being intimately bonded to the opposed surfaces of adjacent nail 10 in the strip. This features which is characteristic of nailing strips according to the invention, results from the manufacturing technique by which such nails are formed into a nailing strip, which will now be described in greater detail.

Figure 7:
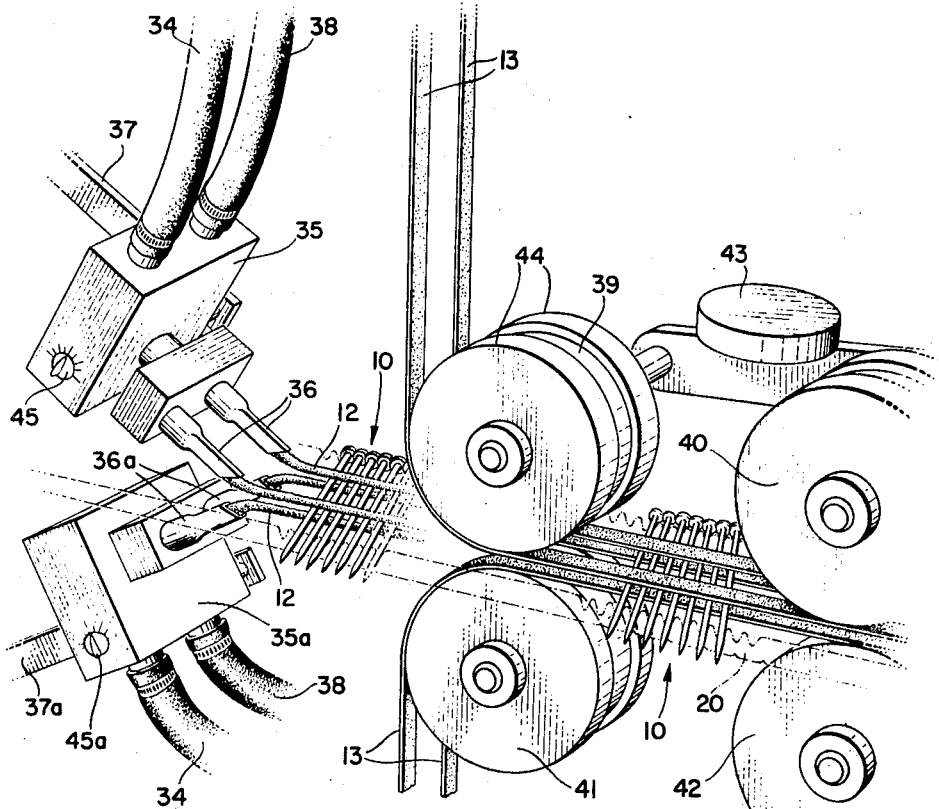
FIG. 7 is a perspective illustration of a further portion of the apparatus shown in FIG. 1 at which the hot liquid melt plastic is applied to the nails, and forming part of stage B and also of stage C of the apparatus.
Figure 8:
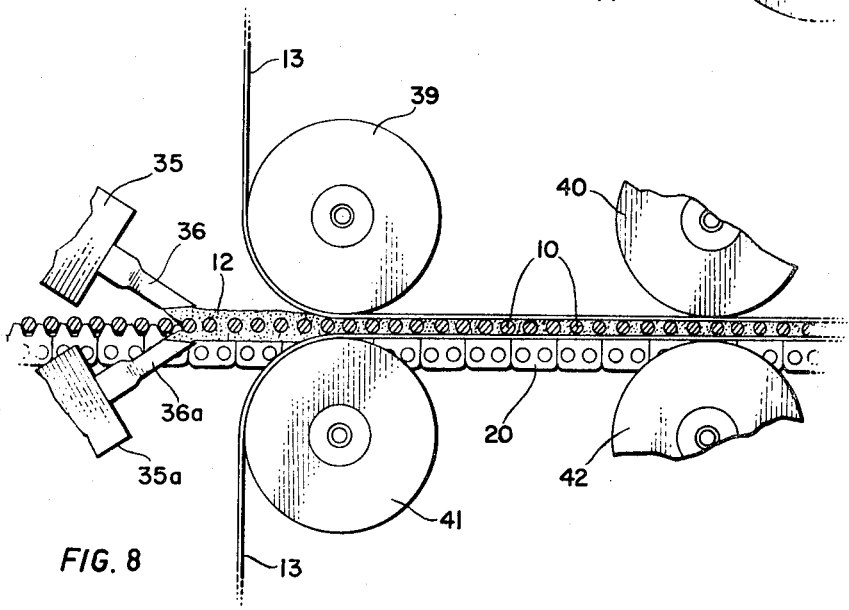
FIG. 8 is a side elevational view of the structure shown in FIG. 7.

From FIG. 1 it will be seen that this preferred embodiment of the invention comprises five distinct stages which are marked A, B, C, D, and E respectively. Stage A comprises the nail feed mechanism and also for the sake of convenience of description, the drive mechanism for the means of moving the nails relative to the rest of the apparatus. Stage B comprises the apparatus for applying the hot liquid melt plastic. Stage C comprises the paper strip application means and the means for applying pressure to the hot liquid melt plastic. Stage D is the drying and hardening stage. Stage E comprises the cut-off and delivery stage at which predetermined numbers of nails in the strip are parted from the remainder and delivered to a delivery table.

Before describing the separate stages A to E, reference will first be made to the conveyor system of the invention by means of which the nails 10 are conveyed from one stage to another. The conveyor system of the invention comprises two endless chains 20 formed of steel links 20a and 20b, each line 20a having an L-shaped bracket 21 attached thereto provided with spaced apart notches 21a formed in their outwardly directed edges shaped and dimensioned to receive the shanks of nails 10, and spaced apart a distance defining the spacing between the axes of adjacent nails 10, when such nails 10 are arranged in spaced apart parallel relationship as shown in FIG. 1 with the head 11 of one nail touching the shank of the next adjacent nail as shown. In most cases, such distance will correspond to the radius of the head 11 plus one half of the thickness of the shank of the nail 10, where the head 11 is circular. However, it will be understood that in order to achieve such a precise spacing between the nails, when the nails are arranged in a slanted fashion as shown in FIG. 1, it is necessary that the notches 21 should be placed somewhat further apart than the final spacing required between the nails 10, for reasons which will become apparent. Chains 20 are supported at one end of free running idler sprockets 22 which are rotatably supported side by side on common axes in a common plane, and which may be provided with suitable adjustment means for ensuring tension in the chains 20 at all times (not shown). At their other end, chains 20 are supported on drive sprockets 23, which are geared together so as to rotate in the same direction in unison, and are driven by a single drive motor (not shown). In order to adjust the relative location on one such chain 20 to the other such chain 20, an arcuate positional adjustment means (not shown permitting one such drive sprocket 23 to be moved arcuately and fixed relatively to its axis, is provided thereon. Idler sprockets 22 and drive sprockets 23 are located in a single common plane, and drive sprockets 23 are spaced apart from one another a distance equal to the spacing between drive sprockets 22 thereby ensuring that the adjacent upper portions of chains 20 move side by side at the same speed along parallel spaced apart paths.

It will be noted that the common plane in which idler sprockets 22 and drive sprockets 23 are located, is tilted, to an angle of somewhere in the region of 30 degrees or so, although such angle may be varied depending upon the size and weight of the nails, between about 10 and 50 degrees. In this way, a nail 10 engaged by notches 21 will be subjected to a component of gravitational force acting along its axis, thereby ensuring that each such nail 10 will lie with a portion of its head 11 in contact with the upper of the two notches 21, thereby avoiding the need for a special nail positioning device in the system. In order to overcome undue flexing of chains 20 supporting means such as rails 24 are arranged below chains 20 along a portion of their length at least whereby to ensure a stiff rigid support for such nails 10, and this in turn ensures that the nails 10 remain in precise alignment while the thermoplastic is being applied. It will be understood that this is of considerable importance to the production of a precisely engineered and controlled strip of nails 10 which are tailored to the specific needs of a specific design or brand of nailing gun (not shown) and that such specifications may vary as between nailing guns and also as between the types of nails used in such guns, requiring adjustment of the spacing between notches 21, which can obviously be achieved only by replacement of chains 20, and also by adjustment of the relative positions of the two chains 20. This last feature is of particular importance since it will be understood that chains 20 must be adjusted so that each nail 10 lies in two predetermined notches 21 one on the upper chain 20 and the other on the lower chain 20 thereby ensuring that it is aligned at precisely the right angle with respect to chains 20, and is also aligned parallel to the next adjacent nail 10. This fine adjustment is of course controlled by the arcuate positional control, and must be maintained constant at all times during the operation of the apparatus in order to obtain a high quality finished product.

Referring once again to FIG. 1, it will be noted that stage A of the apparatus comprises the nail feed mechanism having a vibrator dish 25 of which many different designs are available driven by an independent electrical motor (not shown) the effect of which is to provide a continuous supply of nails at some point around the circumference of the vibrator 25 in well known manner, and a downwardly directed nail feed track 26 communicates between the vibrator 25 and the endless chains 20. Track 26 consists of two rails 27 which are mounted side by side spaced apart a distance to freely accommodate the shank of a nail therein, the nail being retained by engagement of the nail head 11 on the upper edges of the rails 27.

The upper portions of rails 27 (not shown), are oriented and angled downwardly at a steadily increasing angle whereby to cause nails 10 to slide there down. From approximately one third of the way down rails 27, rails 27 are twisted so as to deliver nails 10 to chains 20 in the precise slanted alignment required in the finished nailing strip, in which position they will register with notches 21 in upper and lower brackets 21. At the lower end of rails 27, shoulders 28 are provided which are found to be advantageous in avoiding jamming of nails 10 within rails 27, and are also advantageous in arranging for the nail heads 11 to lie in their overlapping relation, by delivering nails 10 to chains 20 displaced slightly upwardly along their axes so that upon leaving rails 27, the nails will drop into their respective notches 21 and slide downwardly under the influence of gravity until checked by heads 11. Any suitable control mechanism such as photoelectric cell 29 and light source 30 may be provided in registration with rails 27 whereby to detect any failure or misfeed. Obviously, such photoelectric cell 30 is preferably connected to control mechanism for halting the movement of chains 20 in any suitable manner (not shown). In order to ensure that nails 10 are lying squarely in their respective notches 21, a nail detector 31 is arranged adjacent to chains 20 to one side of the lower end of rails 27, adapted to detect the existence of any nail which is out of place, or to detect any unusual spacing between adjacent nails. Obviously, such detector 31 may comprise any suitable microswitch (not shown) and contact arm, and will also be connected so as to halt the operation of chains 20.

Stage B comprises the apparatus for applying the hot melt liquid plastic to the nails, and will be seen to include a tank or suitable container 32 for containing the liquid plastic of well known design and which incorporates suitable heating devices to maintain the plastic at the correct temperature and may if desired also include agitators or other known devices. A suitable pump 33 is provided for continuous pumping of hot plastic from tank 32 under pressure. The pump 33 is in fact a piston type displacement pump, which is rendered necessary by the relatively viscous nature of the hot melt plastic and tends to cause cyclical variations in plastic flow to be discussed below. Two delivery pipes 34 are in turn conected between pump 33 and upper and lower extrustion heads 35, 35A having twin nozzles 36 and 36A, heads 35, 35A being movably mounted on swingable mounting arms 37, 37A so as to permit the same to be swung upwardly or downwardly for access to the nails 11 on chains 20.

According to the invention, the relative flow of plastic from extrusion heads 35, 35A is regulated so that in fact the greater proportion will flow from the upper head 35. Preferably, the proportions are regulated to between about 60% to 80% at the upper head 35 and 40% to 20% at the lower head 35A. The actual proportions selected will depend upon the viscosity of the plastic at operating temperatures, the objective being to secure equal distribution of plastic, when hardened, both above and below the nails. Where a more viscous plastic is used, then the proportions can be at or about 60% and 40% upper and lower. Where the plastic is more liquid, then the proportions should be nearer 80% and 20% upper and lower. In any event, it is found that where it is attempted to employ equal proportions at the upper and lower heads 35 and 35A, the plastic will have a tendency to accumulate towards the underside of the nails which is defiinitely harmful to the end product. Conversely, where all the plastic is extruded from above, then it is found to be impossible to obtain equal distribution, due principally to the variable delivery of the pump 33.

Obviously, such proportioning can be achieved by the use of separate pumps 33 and delivery pipes 34, or by the use of replaceable extrusion nozzles or orifices of different sizes. Preferably, however, the proportioning according to the invention is achieved by means of flow regulating valves 45 and 45A in the extrusion heads 35, 35A respectively by means of which correct flow proportions can readily be established. Additionally, suitable on/off control valve means (not shown) is incorporated in extrusion heads 35, 35A for controlling the flow of plastic to nozzle 36. Obviously, any suitable form of heating means may be incorporated within head 35 so as to ensure that the same maintains a temperature at all times, at which the hot metal plastic material remains liquid.

In order to avoid deterioration of the hot melt plastic material if the machine should be shut down for any length of time, a by-pass return flow system is provided comprising return conduits 38 by means of which the hot liquid plastic may be returned directly to the tank 32 by the operation of pump 33 when the flow control valve means in heads 35, 35A are shut off. Obviously, such flow control means can be operated electrically or preferably pneumatically, and will be arranged to shut off automatically upon activation of any of the safety control shut down devices such as photocell 30 or detector 31, so as to immediately shut off the flow of plastic from nozzle 36, 36a if operation of the machine should be halted while the operator is temporarily absent.

Stage C which comprises the paper strip application means and also the means for applying pressure to the liquid plastic consists essentially of two or more sets of upper and lower rollers indicated respectively as 39, 40, 41 and 42 preferably formed of nylon or some other suitable self lubricating temperature resistant plastic material, and arranged to bear on the nails 11 lying on chains 20 from both upper and lower sides thereof simultaneously whereby to avoid displacement of nails 10 from chains 20. Lower rollers 41 and 42 are mounted on fixed supports, and upper rollers 39 and 40 are mounted on movable supports and are pressed downwardly by any suitable means such as weights 43 permitting the adjustment of the pressure to suit the consistency of the hot melt plastic. In order to maintain rollers 39 to 42 clean and free runing, bands of paper 13 are provided of a width corresponding to slightly more than the width of the extruded plastic when the same is pressed into the space between the nails 10. Any suitable guide means such as grooves or derpressions 44 may be formed in upper and lower rollers 39 and 41 whereby to ensure that the bands 13 are precisely positioned in relation to nails 10, the final pressure being applied by rolls 40 and 42.

Stage D comprises the drying stage and consists essentially of a fan 46 driven by any suitable means such as an electric motor (not shown) delivering air to an elongated air outlet register 47 of a width corresponding more or less to the height of a nail 10 and of a sufficient length to ensure that the hot liquid melt plastic is substantially completely hardened while the chains 20 move continuously in registration therewith.

Stage E comprises the cutoff and delivery stage, since it is necessary that the nails 10 when formed into a nailing strip should embody a precise number of nails and that the amount of plastic 12 left at each end of the nailing strip i.e. extending around the endmost nail at each end of the strip should be precisely cut and controlled in order to ensure trouble free operation in the nailing gun, and this is performed by a so-called "flying shear" such as is used in many other continuous strip forming operations such as in the case of hot or cold metal rolling for example, although obviously, on a somewhat smaller scale. Such a flying shear is indicated generally as 48 and comprises in this embodiment a blade assembly 49 having upper and lower blade portions (not shown) one of which is movable towards and away from the other, blade assembly 49 being mounted on a movable carriage 51 which upon triggering by any suitable nail counting mechanism such as counting means 52, will immediately accelerate to the speed of the chains 20, and cut the plastic precisely midway between two adjacent nails 10. For this purpose, it is obviously necessary that blade assembly 49 is mounted at an angle with respect to the axis of movement of the carriage 51, such angle obviously corresponding precisely to the angle of slanted alignment of the nails 10 lying on chains 20. Obviously, both the accelerating mechanism and the blade closing mechanism are not shown, but could consist of various different well known mechanisms for this purpose which include hydraulic pneumatic and mechanical means, all of which have been used in connection with flying shears in other arts. A delivery table 53 is arranged adjacent to the termination of the path of movement of the flying shear 48 for catching the severed strips of nails and lifting the sam off the chains 20 and permitting them to slide downwardly therefrom under influence of gravity.

Throughout the foregoing description, reference has been made to a "hot melt liquid plastic." There are many different formulations of hot melt plastics, which incorporate mixtures of thermoplastic materials, plasticizers, and other additives to improve the adhesive holding power of the plastic. Such materials are well known for use for example in the packaging industry, and have the advantage that they may be applied hot in a liquid state, and that they cool and harden almost instantaneously, and have a "space filling" function usually only found in relatively expensive adhesives. As a result of these properties, it is possible to provide a good adhesive bond without the lengthy setting time required by conventional adhesives, throughout which such adhesives must usually be subjected to substantial pressure, and in addition, when set and hardened, such hot melt plastics are peculiarly suitable for filling the space between the nails, and providing sufficient grip on the endmost nail of a nailing strip to ensure that when struck by the hammer portion of a nailing gun, it will enter the work piece correctly and will not twist or escape from such hammer.

It will be understood, while reference has been made throughout the foregoing description to nails arranged offset from one another in slanted manner whereby to permit overlapping of the nail heads with one another, in some cases, it will be necessary to space the nails even further apart and to arrange the heads so that they clear one another. One situation where this may be necessary, is in the case of nails having a bevelled head such as are used in certain packaging applications. In this type of nail (not shown) since the edges of the head are bevelled, it is necessary that the hammer of the nailing gun is centered precisely over the centre of such head, since otherwise the head will tend to slip sideways and escape from the hammer. As a result, it is necessary that the entire nail head be exposed to the hammer, and for this reason it is impossible to arrange the nails in overlapping manner. In such a case, obviously, the notches on chains 20 will be somewhat further apart, and the nail feed mechanism will be suitably re-oriented so as to direct and deliver the nails in precise alignment with the alignment of the notches on chains 20. In the preferred case, the nails will be simply arranged parallel and spaced apart with one another with their heads and points in line rather than in the slanting alignment as shown in FIG. 2. In this case the spacing between the nails will be even greater, requiring an increased plastic flow.

Obviously, while the invention has been illustrated with reference to the preferred embodiment of the invention in which the chains 20 are arranged to lie in a tilted plane, it is possible that in some cases, it may be desirable to arrange for chains 20 to locate nails in a precisely horizontal plane in which case, some additional means will be provided, in the case of a horizontal arrangement, for ensuring that all of the nails lie in the correct alignment withone another, since this can no longer be ensured by the gravitational component of force acting thereon.

The method of operation according to the invention includes the steps of arranging the nails on the conveyor in their predetermined spaced relation and moving them continuously, continuously extruding hot melt plastic material in a liquid or semi-liquid (i.e. "plastic") state in at least two spaced apart parallel strips directly against both upper and lower sides of the nails, simultaneously in proportions of between about 60% to 80% on the upper sides and 40% to 20% on the lower sides, applying pressure to the plastic material on both sides of the nails while in said liquid or semi-liquid state to force or squeeze the same into the spaces between the nails and procure equal flow on both sides, cooling the plastic material, and shearing the plastic material at predetermined intervals to define nailing strips embodying a predetermined number of nails. Obviously these specific steps could be performed by a variety of different apparatus, and could be performed for example while the nails were laying flat.

The apparatus according to the invention operates substantially as follows. In stage A the vibrator dish 25 sorts out the nails and delivers them one at a time to the nail feed track 26, and the nails slide under the influence of gravity downwardly along feed track 26 during which, the nails are skewed by the orientation of rails 27 into the precise slanted alignment in which they will be required in the finished nailing strip. As they reach the lower end of rail 27, the lowermost nail will register precisely with a specific pair of notches 21 on chains 20 and will drop into such pair of notches and be moved sideways away from the rails 27. The next nail 10 will then be ready to drop into the next pair of notches, but is restrained from dropping freely from rail 27 by the intervening portions of brackets 21 which of course engage the underside of the lowermost nail and prevent it from dropping until it registers precisely with its pair of notches 21.

Any nail which does not precisely fall into its specific pair of notches 21 will be detected by the nail detector 31 which will immediately stop the machine in the event of a misfeed. An operator can then manually place a nail in the correct pair of notches and restart the machine.

As chain 20 moves in unison carrying the nails thereon, they approach stage B at which the hot liquid plastic material is extruded through the twin parallel nozzles 36 and 36A which as noted extrude plastic at an angle to the plane in which the nails are travelling whereby to promote the flow of such plastic material in the direction of movement of the nails. As stated, the rate of flow from the nozzles is regulated so as to extrude the desired quantity of plastic bearing in mind the spacing between the nails, the speed of operation of the machine, the pressure at which the plastic is extruded and other factors which will be determined during the trial operation of the machine, and in the range of proportions stated above. As the chains 20 continue to move the nails carrying the hot plastic away from stage B they enter stage C of the machine at which point strips of readily tearable paper indicated as 13 are pressed firmly against each side of the nails, the purpose of the paper being twofold. In the first place, it is desired to avoid contact between the parts of the machine and the hot plastic which is at this point extremely tacky and would rapidly accumulate on the rollers and other parts of the machine and prevent its efficient operation. In the second place, it is desired to add a certain amount of strength to the plastic material, and it is found that strips of paper are particularly suitable since while they are readily torn and broken up in the operation of the nailing gun or hammer itself, they add a certain amount of stiffness to the nailing strips which assists in avoiding accidental breakage prior to insertion into the nailing gun. Simultaneously with the application of such paper strips, substantial pressure is applied, through such paper strips 13 directly to the hot plastic material which squeezes it between the nails and causes it to flow round the nails and conform to the shape thereof.

The cooling of the plastic material at stage D requires no description, being achieved merely by the blowing of air which may or may not be heated around the nails on the conveyor belt, either by blowing such air out of the register 47 or alternatively drawing it in through register 47 under suction, in which case, a hood or baffle would normally be arranged around the upper side of the nails on the conveyor means so as to guide the air flowing therearound. Such a system would have the added advantage of avoiding the distribution of unpleasant or harmful odours throughout the working premises and possibly over heating of the working premises, since the air once drawn in through the register 47 could then be ducted away and vented exteriorly of the building.

At stage E, the flying shear member 48, when triggered by counting means 52, will immediately accelerate on movable carriage 51 to the speed at which the conveyor is moving, and upon reaching a predetermined precise location, the blade member 49 is operated so as to cut through the plastic material between two nails whereby to cutoff a predetermined number of nails so as to form a nailing strip. After which the severed strip of nails is lifted off chains 20 by means of the delivery table 23 and they are allowed to slide downwardly therefrom.

The foregoing is a description of a preferred embodiment of the invention and is given here by way of example only. The invention is not to be taken as limited to any of the specific features or stesp described, but comprehends all such variations therof as come within the spirt and scope of the appended claims.

What I claim is:
1. The method of forming nails into a nailing strip with the nails in spaced apart parallel location in the strip and being supported in such spaced location by synthetic plastic material interposed therebetween said nails having heads at one end and points at the other and comprising:
   supporting said nails in predetermined spaced apart location on upper and lower moving support means lying in a transverse plane angled between vertical and horizontal planes, with the heads of said nails engaging and lying against said upper support means and preventing and holding said nails from sliding off said support means under the influence of gravity whereby they are located in position on said support means by gravitational force acting thereon with upper sides of said nails directed upwardly and under sides of said nails directed downwardly, and with the heads of said nails lying in an upper plane and the points of said nails lying in a lower plane;
   extruding a predetermined first volume of hot melt plastic material in liquid or semi-liquid form in at least two spaced apart parallel strips from above said nails downwardly onto said upper side of said nails, said volume being between about 60% to 80% of the total volume required to secure said nails in said strip, and simultaneously applying a predetermined second volume of hot melt plastic material in liquid or semi-liquid form in at least two spaced apart parallel strips from beneath said nails upwardly onto said underside of said nails in registration with said strips on said upper side said second volume being between about 40% to 20% of the said volume, said upper and under strips merging together around and between said nails;
   applying pressure to said plastic material from above and below said nails while the same is still in said liquid or semi-liquid state to force at least some of the same into the spaces between the nails;
   cooling said plastic material; and
   shearing said plastic material at predetermined intervals to define nailing strips containing a predetermined number of nails.
2. The method of forming nails into a nailing strip as claimed in claim 1 including the step of arranging said nails in said predetermined spaced apart location, said nails lying in a plane angled at between 10 degrees and 50 degrees to the horizontal.
3. The method of forming nails into a nailing strip as claimed in claim 1 including the step of applying strips of paper or the like tearable covering material over said spaced apart parallel strips of hot plastic material and applying said pressure to said paper or the like strips.

References Cited
UNITED STATES PATENTS

| | | | |
|---|---|---|---|
| 3,401,072 | 9/1968 | Pearson | 156—296 |
| 3,315,436 | 4/1967 | Baum et al. | 53—35 |
| 3,342,659 | 9/1967 | Baum et al. | 156—296 |
| 3,358,822 | 12/1967 | O'Connor | 206—56 |
| 3,471,008 | 10/1969 | Reich et al. | 206—56 |

DANIEL J. FRITSCH, Primary Examiner

U.S. Cl. X.R.

156—244, 250, 296, 498, 500, 522, 552, 558, 560, 566; 206—56 DF